Oct. 24, 1944.   A. C. SAMPIETRO   2,361,127
SYNCHRONISING MEANS FOR VEHICLE AND OTHER MACHINERY CLUTCHES
Filed June 30, 1943   2 Sheets-Sheet 1

Inventor
A. C. Sampietro
By Haseltine Lake
Attys

Oct. 24, 1944.　　　A. C. SAMPIETRO　　　2,361,127
SYNCHRONISING MEANS FOR VEHICLE AND OTHER MACHINERY CLUTCHES
Filed June 30, 1943　　　2 Sheets-Sheet 2

Inventor
A. C. Sampietro
By Glascock Downing Seebold
Attys

Patented Oct. 24, 1944

2,361,127

UNITED STATES PATENT OFFICE 2,361,127

SYNCHRONIZING MEANS FOR VEHICLE AND OTHER MACHINERY CLUTCHES

Achilles Charles Sampietro, Coventry, England, assignor to Humber Limited, Coventry, England Application June 30, 1943, Serial No. 492,934
In Great Britain July 22, 1942

3 Claims. (Cl. 192—01)

This invention has for its object to provide improved means for synchronizing relatively rotating members of a vehicle or other machinery clutch to enable engagement of the members to be effected with a minimum of shock.

The invention comprises the combination with the clutch, of an electric current generator dependent for its action on relative rotation of the main members of the clutch, and means responsive to the generator current for actuating the throttle or any other appropriate controlling means associated with the engine or other source of power from which the clutch derives its motion.

In the accompanying sheets of explanatory drawings.

Figure 1:
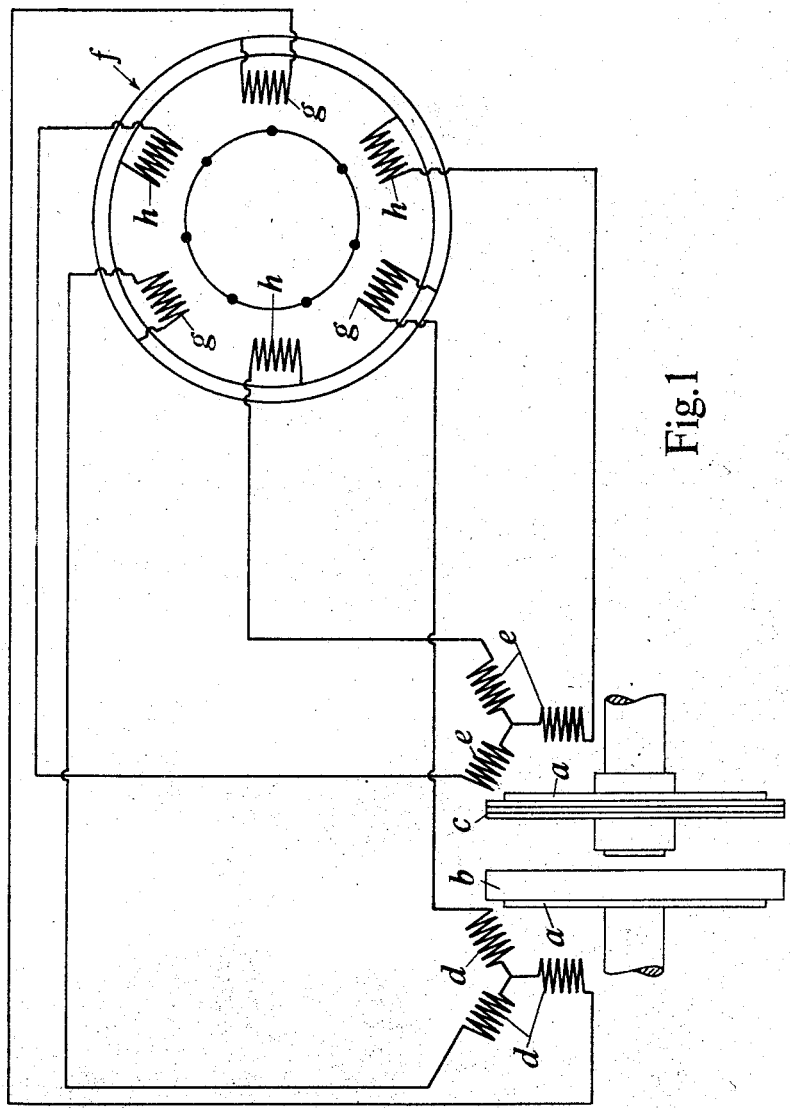
Figure 1 is a diagram illustrating one mode of carrying the invention into effect.

In carrying the invention into effect as shown in Figure 1, I arrange an electro- or permanent magnet or magnets $a$ in association with each of the two main driving and driven members $b$, $c$, of the clutch. Also in respective association with the members $b$, $c$ I arrange non-rotatable windings $d$, $e$ in which alternating current can be generated by the rotation of the corresponding members. In addition I employ a rotary induction motor $f$ having opposed field windings $g$, $h$, these being respectively supplied with current from the two generator windings $d$, $e$. The motor $f$ is adapted to operate the throttle or any other suitable controlling means associated with the engine or other source of motion from which the driving member $b$ derives its motion.

The speed and direction of the motor $f$ depend on the field of the motor, and this in turn depends on the relative rotation of the clutch members $b$, $c$. If this is considerable the motor $f$ will cause the speed of the engine or other source of motion to be reduced or increased, and thus bring the relative speeds of the clutch members $b$, $c$ sufficiently near to equality to enable them while rotating to be engaged without shock.

Whilst the above described arrangement of generator is preferred, it might be convenient in some cases to provide the magnets on only one of the clutch members, and the generator windings on the other, the motor being then provided with a single set of field windings.

Figure 2:
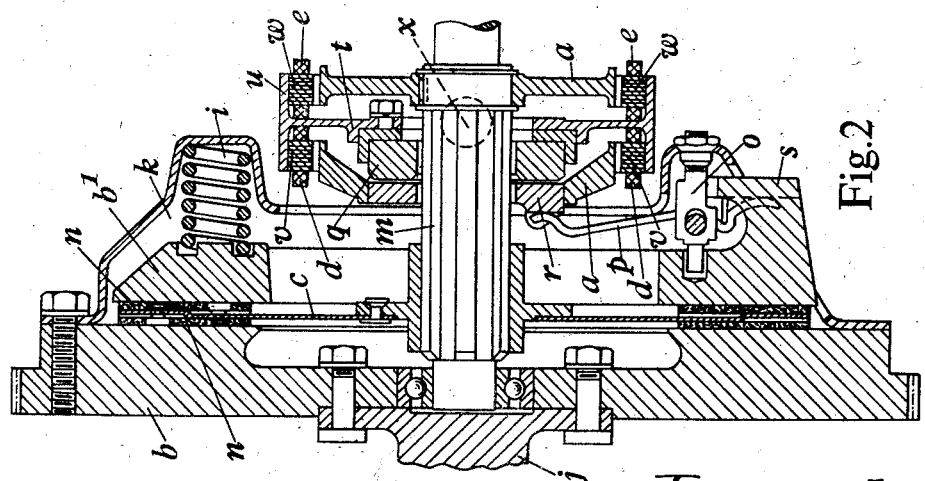
Figure 2 is a sectional elevation of a friction clutch embodying the electric current generator.

The magnets $a$ and the windings $d$, $e$ may be applied to the clutch in any convenient manner, and by way of example are shown in Figure 2 applied to a friction clutch. This clutch is provided with a pair of driving members $b$, $b^1$, and a driven member $c$ situated between the driving members, these three members being arranged coaxially with each other. The driving member $b$ is secured on a driving shaft $j$, and may have the form of a fly wheel. The other driving member $b^1$ is of annular form and is arranged within an annular housing $k$ secured on and extending from one side of the member $b$. The driven member $c$ has the form of a disc secured to a driven shaft $m$, the latter being coaxial with the driving shaft $j$. Friction rings or pieces $n$ are arranged in the usual manner between the adjacent faces of the members $b$, $c$, $b^1$. Helical compression springs as $i$ are arranged between the outer side of the housing $k$ and the adjacent face of the driving member $b^1$, and serve to provide the force required to effect a frictional driving connection between the two driving members $b$, $b^1$ and the driven member $c$. Arranged in and carried by the housing $k$ are adjustable supports $o$ for radially disposed levers as $p$ through the agency of which the frictional driving connection between the members $b$, $b^1$ and $c$ can be released, the levers being pivoted to the supports at positions between their ends. The levers $p$ are operable by an axially slidable but non-rotatable thrust ring $q$ which surrounds the driven shaft $m$ and is adapted to act on the inner ends of the levers through a rotatable thrust ring $r$, the latter having a driving connection with the housing $k$, and the outer ends of the levers being adapted to act on abutments as $s$ formed on or secured to the driving member $b^1$. The permanent magnets $a$ which may be of bar form are respectively secured on the rotatable thrust ring $r$ and the driven shaft $m$ at opposite sides of the non-rotatable thrust ring $q$, sufficient space being provided between the magnets to permit the axial movement of the latter thrust ring required to control the clutch, and to allow for wear of the friction rings or pieces $n$. Arranged between the magnets $a$ and secured at its inner periphery to the non-rotatable thrust ring $q$ is an annular disc $t$ which at its outer periphery is formed with a cylindrical flange $u$, the latter being arranged to surround the magnets. The windings $d$, $e$ which co-operate with the magnets $a$ are provided with laminated cores $v$, $w$ and mounted on the inner periphery of the flange $u$. At a pair of diametrically opposite positions the flange $u$ is provided with trunnions as $x$ which are supported by a fork (not shown) whereby axial movement in the direction for releasing the clutch can be imparted through the disc $t$ to the thrust ring $q$.

Figure 3:
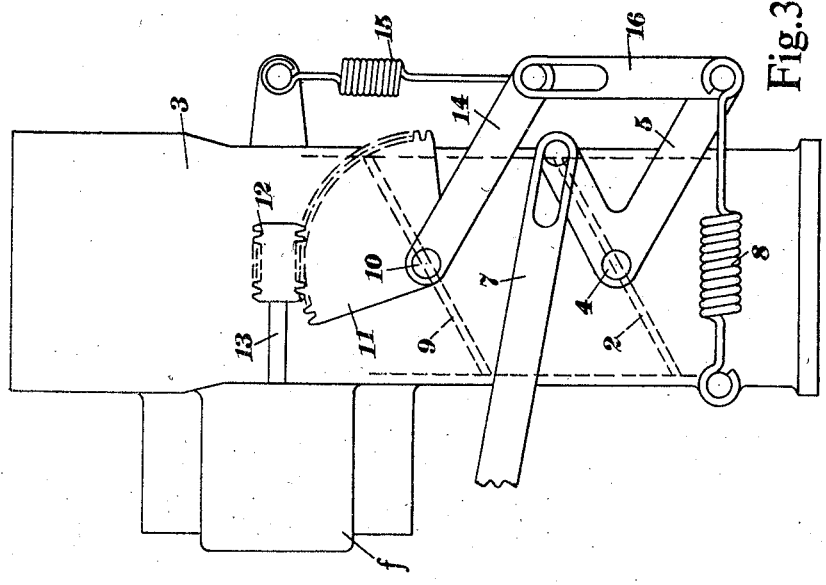
Figure 3 is a side view illustrating a mode of connecting the motor to a throttle valve of the engine.

Any convenient means may be provided for connecting the motor $f$ to the controlling means associated with the source of motion from which the driving member $b$ derives its motion, an example of such connecting means being shown in Figure 3. In this example, 2 indicates the usual throttle valve of a carburetter from which fuel is supplied to an engine for imparting motion to the driving member $b$, this valve being situated in the fuel supply duct 3 of the carburetter, and being secured on an operating spindle 4. Secured on the spindle 4 is a bell-crank lever 5 which at one end has a pin-and-slot connection with a pull rod 7 whereby the throttle valve 2 can be opened against the action of a spring 8, the latter being connected to the other end of the lever. Also arranged in the duct 3 is another throttle valve 9, this being secured on a spindle 10 which is operatively connected through skew gears 11 and 12 with the spindle 13 of the motor $f$. Secured at one end to the spindle 10 is a lever arm 14 which at its outer end is loaded by a spring 15, the latter being weaker than the first mentioned spring 8. The outer end of the lever arm 14 has a pin-and-slot connection with one end of a link 16 which at its other end is connected to the spring loaded end of the bell-crank lever 5. The arrangement above described is such that whilst motion of the first throttle valve 2 is accompanied by corresponding motion of the second throttle valve 9, both valves can be opened by the motor $f$ without affecting the position of the pull rod 7 associated with the first valve, and that the second valve can be closed by the motor without affecting the position of the first valve.

The invention is especially useful on vehicle power transmission systems having automatic means for changing the gear ratios in response to variations of speed, or load or both, but it may be applied to other analogous uses.

Moreover the invention is not limited to the example described as subordinate details may be varied to suit requirements. Thus, instead of using a rotary motor I may employ a solenoid having opposed windings. Also, instead of using an alternating current generator I may employ a direct current generator.

Having thus described my invention what I claim as new and desire to secure by Letters Patent is:

1. Means for synchronizing relatively rotating members of a vehicle or other clutch, comprising the combination with the clutch, of electric current generating means dependent for its action on relative rotation of the main driving and driven members of the clutch, and means responsive to the current generated by the said generating means for actuating controlling means associated with the source of power from which the driving member of the clutch derives its motion.

2. Means as claimed in claim 1, in which the current-responsive means comprises a rotary electric motor.

3. Means as claimed in claim 1, in which the current-responsive means comprises a rotary electric motor, and in which the electric current generating means comprises magnets rotatable with the main members of the clutch, and non-rotatable generating windings, the motor being provided with opposed field windings which are connected to the generating windings so that the speed and direction of the motor depend on relative rotation of the said members.

ACHILLES CHARLES SAMPIETRO.